(12) United States Patent
Contreras et al.

(10) Patent No.: US 11,822,862 B2
(45) Date of Patent: *Nov. 21, 2023

(54) TECHNIQUES FOR GENERATING ONE OR MORE SCORES AND/OR ONE OR MORE CORRECTIONS FOR A DIGITAL TWIN REPRESENTING A UTILITY NETWORK

(71) Applicant: Bentley Systems, Incorporated, Exton, PA (US)

(72) Inventors: Alfredo Contreras, Helotes, TX (US); Mike Carlisle, Austin, TX (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,301

(22) Filed: Nov. 14, 2022

(65) Prior Publication Data
US 2023/0069866 A1    Mar. 9, 2023

Related U.S. Application Data

(63) Continuation of application No. 16/658,318, filed on Oct. 21, 2019, now Pat. No. 11,526,638.

(51) Int. Cl.
| | |
|---|---|
| *G06F 30/18* | (2020.01) |
| *G06F 16/28* | (2019.01) |
| *G06F 16/25* | (2019.01) |
| *G06Q 50/06* | (2012.01) |
| *G06N 20/00* | (2019.01) |
| *G06F 9/451* | (2018.01) |
| *G06F 119/06* | (2020.01) |

(52) U.S. Cl.
CPC ............. *G06F 30/18* (2020.01); *G06F 9/451* (2018.02); *G06F 16/258* (2019.01); *G06F 16/284* (2019.01); *G06N 20/00* (2019.01); *G06Q 50/06* (2013.01); *G06F 2119/06* (2020.01)

(58) Field of Classification Search
None
See application file for complete search history.

(56) References Cited

U.S. PATENT DOCUMENTS

| | | |
|---|---|---|
| 2011/0191475 A1 | 8/2011 | Sudit |
| 2019/0266297 A1 | 8/2019 | Krause |
| 2019/0301963 A1 | 10/2019 | Yoshikawa |
| 2019/0303791 A1 | 10/2019 | Yoshikawa |
| 2020/0158290 A1 | 5/2020 | Hlady et al. |
| 2020/0410590 A1 | 12/2020 | Regmi |

*Primary Examiner* — Craig C Dorais
(74) *Attorney, Agent, or Firm* — Cesari and McKenna, LLP

(57) ABSTRACT

Techniques are provided for generating score(s) and/or correction(s) for a digital twin representing a utility network. One or more bridges transform data, from a plurality of system and associated with a utility network, to a different format, e.g., relational database format. A process generates a digital twin of the utility network utilizing the data in the different format. A data quality service (DQS) performs evaluations and/or analyses of the digital twin to generate a baseline score and an updated score representing a state of the digital twin if corrections are applied. If the updated score meets or is above a threshold value, the DQS automatically applies and save the corrections to the digital twin. If the updated score does not meet the threshold value, the DQS presents a failure notification and one or more graphical representations of the utility network such that incremental corrections can be made.

19 Claims, 5 Drawing Sheets

TECHNIQUES FOR GENERATING ONE OR MORE SCORES AND/OR ONE OR MORE CORRECTIONS FOR A DIGITAL TWIN REPRESENTING A UTILITY NETWORK

CROSS-REFERENCE TO RELATED APPLICATIONS

The present application is a continuation of commonly assigned U.S. patent application Ser. No. 16/658,318, which was filed on Oct. 21, 2019, by Alfredo Contreras et al., for TECHNIQUES FOR GENERATING ONE OR MORE SCORES AND/OR ONE OR MORE CORRECTIONS FOR A DIGITAL TWIN REPRESENTING A UTILITY NETWORK, which is hereby incorporated by reference.

BACKGROUND

Technical Field

The present disclosure relates generally to computer-based infrastructure modeling, and more specifically to techniques for generating one or more scores and/or one or more corrections for a digital twin representing a utility network.

Background Information

Throughout the design, construction and operation of an infrastructure, such as a utility network (e.g., electric, gas, water, cooling and heating, wastewater, etc.), data associated with the characteristics and attributes of the utility network may be stored as structured and unstructured data at a plurality of different systems that are segregated. As such, modeling the utility network based on the data can be difficult and challenging. In addition, as the utility network grows, changes, and becomes more complex, managing the utility network, evaluating/analyzing the utility network, and identifying potential corrections for the utility network can be laborious.

SUMMARY

Techniques are provided for generating one or more scores and/or one or more corrections for a digital twin representing a utility network. A plurality of different systems may store data associated with the utility network (e.g., electric, gas, water, cooling and heating, wastewater, etc.) as structured and unstructured data. One or more bridges, of cloud-based software, may transform the data from one or more first formats to a second format, e.g., a format compatible with a relational database. A process, of the cloud-based software, may utilize the data in the second format to generate a model, i.e., digital twin, of the utility network, i.e., physical twin. The model may be stored on a repository of one or more repositories and may represent an original state of the utility network.

In response to a detecting a change to the digital twin, a data quality services (DQS) of the cloud-based software may perform a background process and evaluate and/or analyze the digital twin representing the utility network. In addition or alternatively, the one or more evaluations and/or analysis may be performed on-demand and based on one or more selections made by a user at a user interface of a client device. For example, the one or more evaluations and/or analysis may include, but are not limited to, (1) an evaluation of attributes of the digital twin representing the utility network, (2) an evaluation of connectivity of the digital twin representing the utility network, (3) an evaluation of anomalies of the digital twin representing the utility network utilizing machine learning, or (4) an analysis of a performance and/or behavior associated with the digital twin representing the utility network.

Based on performing the one or more evaluations and/or analysis, the DQS may generate one or more correction to be applied to the digital twin. In addition, the DQS may generate an "as is score" (baseline score) representing the original state of the digital twin and a "post auto-correction score" (updated score) representing an updated state of the digital twin if the corrections are applied.

The DQS may provide, via a user interface of a client device, the baseline score, the updated score, and/or the corrections for the digital twin, such that a user can understand and evaluate the utility network. The baseline score and the updated score may be displayed in the same user interface. Accordingly, the baseline score and the updated score may become more similar over time and as the digital twin is progressively corrected, thus allowing the user to view and understand the progress and evolution of the digital twin. The DQS may also provide, via the user interface, one or more graphical representations (e.g., heat maps, etc.) of the utility network based on the generated scores and/or evaluation(s) and/or analysis, such that the user can further understand and evaluate the utility network.

In an embodiment, when the updated score meets or is above a threshold value, the DQS automatically applies and saves the corrections to the digital twin such that the updated digital twin represents the updated state of the utility network. In addition, the utility network may be notified of corrective actions to be implemented at the utility network such that the physical twin matches the digital twin. When the updated score does not meet the threshold, the corrections are not applied to the digital twin and the DQS may provide a failure notification via the user interface to the user. In addition, one or more graphical representations (heat maps, etc.) of the digital twin may be provided by the DQS through the user interface, and a user may evaluate the graphical representations and apply one or more selected correction to the digital twin and re-perform the evaluations and/or analysis. Accordingly, the user can iteratively and incrementally improve the digital twin with the selected corrections until, for example, the updated score reaches a particular value or meets the threshold value. The DQS may then notify the utility network such that the corrective actions are implemented at the utility network such that the physical twin matches the digital twin.

It should be understood that a variety of additional features and alternative embodiments may be implemented other than those discussed in this Summary. This Summary is intended simply as a brief introduction to the reader and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
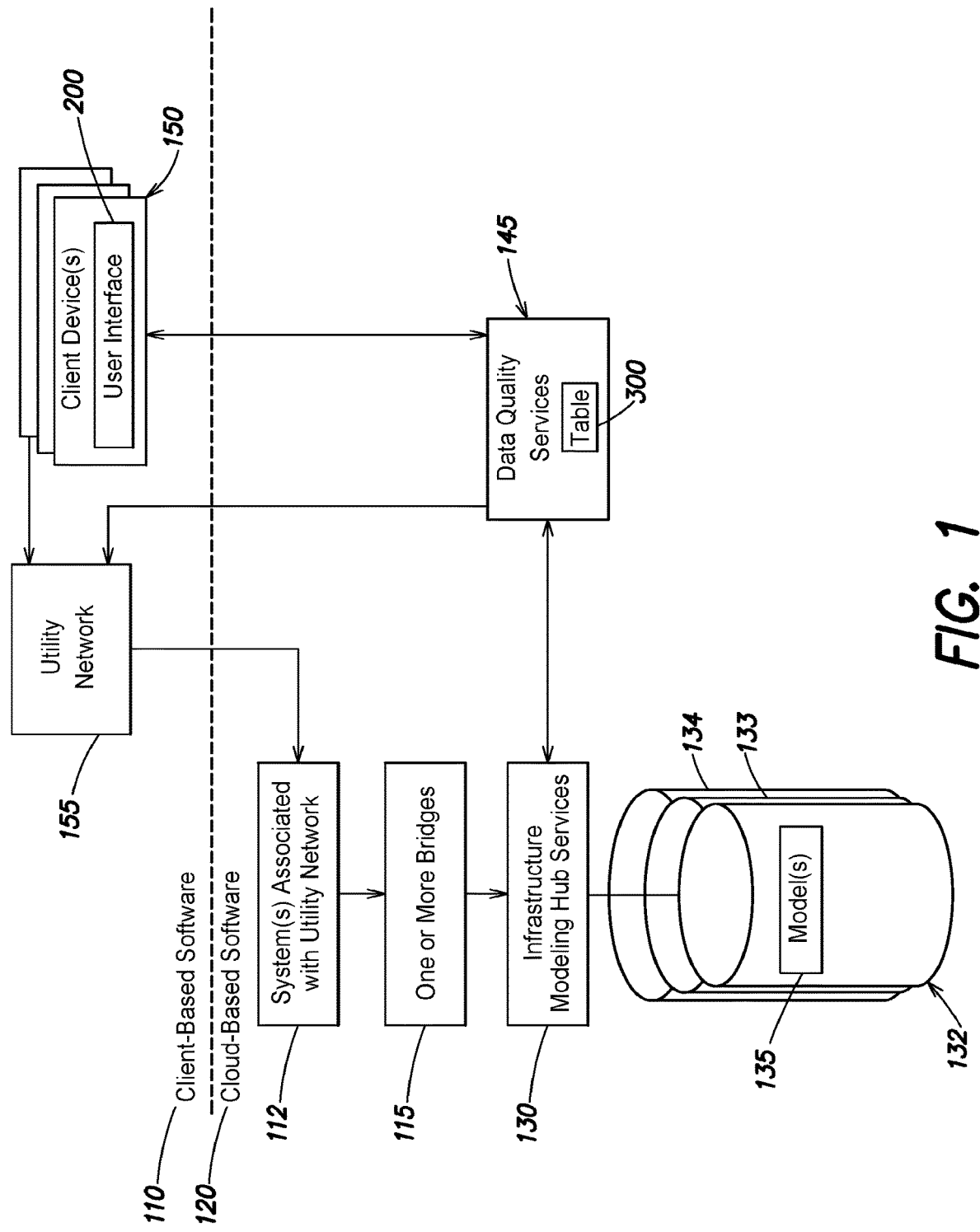
FIG. 1 is a high-level block diagram of at least a portion of an example infrastructure modeling software architecture in accordance with an example embodiment.

FIG. 1 is a high-level block diagram of at least a portion of an example infrastructure modeling software architecture in accordance with an example embodiment. The architecture may be divided into client-based software 110 executing on one more or more computing devices arranged locally on-premises or hosted for an enterprise's use (collectively "client devices"), and cloud-based software 120 that is executed on one or more remote computing devices ("cloud computing devices") accessible to the enterprise, and other enterprises, over the Internet.

The client-based software 110 may include a utility network 155 and one or more client devices 150. The utility network 155 may for example, be a network associated with electric, gas, water, cooling and heating, wastewater, etc. The utility network may include a plurality of components, (not shown), such as hardware components, that have a plurality of attributes, connectivity, and characteristics. Client device 150 may be a laptop, a desktop, a mobile computing device, or any other computing device that executes client-side software 110. The client device 150 may communicate with the utility network 155.

The cloud-based software 120 may include one or more system 112 that are associated with the utility network 155, infrastructure modeling hub services (e.g., iModelHub services) 130, one or more bridges 115, repositories 132-134, and data quality services (DQS) 145. The systems 112 associated with the utility network 155 may include, but are not limited to, a Geographical Information System (GIS), a Distribution Management System (DMS), and/or a Customer Management System (CMS). The GIS may store stores spatial location information associated with the components that make up the utility network 155, network connectivity information associated with the components that make up the utility network 155, and physical properties (i.e., attributes) associated with the components that make up the utility network 155. The DMS may store switching state information associated with the utility network and load information associated with the utility network. For example, the DMS may store current load information associated with the utility network. The CMS may store load information. For example, the CMS may store historical load information associated with the utility network In addition, the CMS may store address information, meter number information, and other contextual information associated with the utility network. The data from the one or more systems 112 associated with the utility network 115 may be stored as structured or unstructured data. In addition, although FIG. 1 depicts the systems 112 being on the cloud-based software 120 side, it is expressly contemplated that the systems 112 may be on the client-based software 110 side.

Each of the one or more bridges 115 may be a transformer that transforms the data from the systems 112 from one or more first formats to a second format that is, for example, compatible with a relational database (e.g., a SQLite database). The iModelHub services 130 provides centralized management and synchronization support. Specifically, the iModelHub services 130 may receive, form the one or more bridges 115, the data transformed to the second format that is compatible with a relational database, and generate a model 135 representing the utility network 115. In addition, the iModelHub services may detect one or more changes to the model 135. As used herein, model 135 and digital twin may be used interchangeable and may refer to a digital representation of a physical asset, e.g., utility network (physical twin). The iModelHub services 130 may maintain repositories 132-134 that stores one or more models 135, i.e., digital twins, which represent the utility network 155.

The DQS 145 may generate one or more scores and/or one or more corrections for a digital twin representing the utility network 155 according to the one or more embodiments described herein. Further, the DQS 145 may generate other graphical representations (heat maps, etc.) for the utility network 155 according to the one or more embodiments described herein. The DQS 145 may communicate with the client device 150 via user interface 200 and may also communicate with the iModelHub services 130 and the utility network 155. The client devices 150, the infrastructure modeling hub services 130, the systems 112, the one or more bridges 115, and the DQS 145 may include processors, memory, storage systems, and other hardware (not shown).

In an embodiment, the iModelHub services 130 may detect a change to a model 135, e.g., digital twin, stored on a repository of the repositories 132-134. In response to detecting the change, the DQS 145 may perform a background process and evaluate and/or analyze the digital twin representing the utility network 155 according to the one or more embodiments described herein. For example, the one or more evaluations and/or analysis may include, but are not limited to, (1) an evaluation of attributes of the digital twin representing the utility network, (2) an evaluation of connectivity of the digital twin representing the utility network, (3) an evaluation of anomalies of the digital twin representing the utility network utilizing machine learning, or (4) an analysis of a performance and/or behavior associated with the digital twin representing the utility network.

In addition or alternatively, the one or more evaluations and/or analysis may be performed on-demand and based on one or more selections made at the user interface 200 of the client device 150 by a user.

Figure 2:
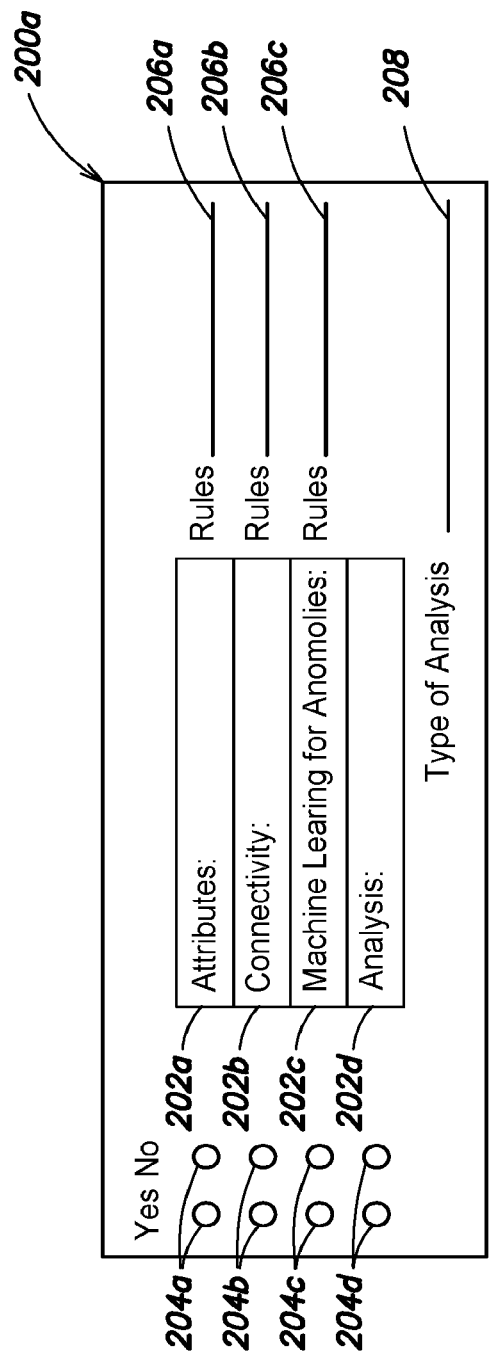
FIG. 2 is a diagram illustrating an example first user interface for selecting one or more evaluations and/or analysis to be performed of a digital twin representing a utility network in accordance with an example embodiment.

FIG. 2 is a diagram illustrating an example first user interface for selecting one or more evaluations and/or analysis to be performed of a digital twin representing a utility network in accordance with an example embodiment. The first user interface 200a may include a plurality of entries for each type of evaluation/analysis the DQS 145 may perform of the digital twin representing the utility network 155. A first evaluation/analysis entry 202a may correspond to an evaluation of one or more attributes of the digital twin representing the utility network 155. For example, the one or more attributes may include, but are not limited to, a voltage value or a current value at a particular component represented in the digital twin, voltage rating of a particular component (i.e., maximum voltage the component is allowed to run at) represented in the digital twin, a size of the particular component represented in the digital twin, install date of a particular component represented in the digital twin, an age of the particular component represented in the digital twin, and/or any other attributes of one or more components represented in the digital twin.

A second evaluation/analysis entry 202b may correspond to an evaluation of the connectivity of the digital twin representing the utility network 155. For example, it may be determined whether each component represented in the digital twin is connected to a least one other component, whether a particular component is connected to a required number of other components, etc. A third evaluation/analysis entry 202c may correspond to an evaluation of anomalies in the digital twin representing the utility network 155 utilizing machine learning. An anomaly may be, for example, a behavior/performance or characteristic of a component represented in the digital twin that is different than an expected behavior/performance or characteristic. For example, an anomaly may be that an aluminum conductor is connected to a copper conductor at a first end and another copper conductor at a second end. Example machine learning techniques may include, but are not limited to, HDBScan, k-means clustering, Random Isolation Forest, etc. A fourth evaluation/analysis entry 202d may correspond to an analysis of the digital twin after one or more evaluations have been performed. For example, the analysis may be a power flow analysis of the digital twin representing the utility network 155, a current flow analysis of the digital twin representing the utility network, a short circuit analysis of the digital twin representing the utility network 155, a structural analysis of the digital twin representing the utility network 155, a state estimation analysis of the digital twin representing the utility network 155, etc.

In addition, the first user interface 200a may include selection fields 204a-204d, where each selection field corresponds to a different evaluation/analysis entry 202a-202d. In response to selecting yes or no from each selection field 204a-204d, for example by using a cursor controlled by a mouse, a user may indicate which evaluations/analyses are to be performed by the DQS 145 on the digital twin representing the utility network 155. For example, in response to a user selecting yes from selection field 204a, the DQS 145 may be instructed to evaluate the attributes of the digital twin representing the utility network 155. In response to the user selecting no from the selection field 204a, the DQS 145 may be instructed to not evaluate the attributes of the digital twin representing the utility network 155. The DQS 145 may be instructed to evaluate/analyze other aspects of the digital twin that correspond to entries 202b-202d based on a similar selection of yes or no from selection fields 204b-204d.

First user interface 200a may further includes rule fields 206a-206c that respectfully correspond to evaluation/analysis entries 202a-202c. The user may provide text, via a keyboard or other input device, which provides constraints regarding the corresponding evaluation/analysis if the corresponding evaluation/analysis is selected from selection fields 204a-204d. For example, if the user selects yes from selection field 204a, the user may input a rule into rule field 206a indicating that during the analysis of the attributes of the digital twin representing the utility network 155, a particular attribute (e.g., voltage, current, etc.) should be evaluated. In addition or alternatively, the rule may indicate that a particular attribute should be weighted more heavily than a different attribute. For example, the rule may indicate that the voltage attribute of the digital twin has higher importance during the attribute evaluation than the voltage rating attribute. Other attributes that may be given high importance may include, but are not limited, to, size of a components (e.g., conductor size), material of components (e.g., aluminum), component type (e.g., Triplex), etc. A user may similarly provide text, via a keyboard or other input device, in fields 206b and 206c to respectfully provide rules/weights for the evaluation of connectivity and anomalies.

In addition, first user interface 200a may include type of analysis field 208. The user may provide text, via a keyboard or other input device, which provides constraints regarding the type of analysis to be performed when yes is selected from selection field 204d corresponding to an analysis of the digital twin. For example, the type of analysis field 208 may indicate that the type of analysis to be performed is a power analysis of the digital twin representing the utility network, a current analysis of the digital twin representing the utility network, etc. The DQS 145 may perform the evaluation(s)/analysis of the digital twin representing the utility network 155 as a background process and/or based on the selections made and input provided via the first user interface 200a, for example.

As an example, let it be assumed that the utility network 155 is a power network that includes, for example, a plurality of components (not shown) that have particular attributes, connectivity, characteristics, and associated information. For example, the power network may include a transmission system that takes electricity from one or more generating stations to one or more substations where voltage is reduced to between 2 kV and 35 kv. The electricity may travel through primary conductors to distribution transformers that further reduce the voltage to 120V/240V. The electricity may then travel through secondary conductors to meters. Thus, information regarding the characteristics, attributes, connectivity, behavior, performance, etc., of the power network may be stored on systems 112 (e.g., GIS, DMS, and CMS).

Based on this example, a digital twin, e.g., model 135, representing the power network is stored on a repository of the one or more repositories 132-134 according to the one or more embodiments described herein. Reference to a power network as the utility network 155 is for illustrative purposes only, and it is expressly contemplated that the one or more embodiments described herein may apply to any of a variety of different utility networks (e.g., electric, gas, water, cooling and heating, wastewater, etc.).

Further, and in this example, let it be assumed that the iModelHub services 130 detects a change to the digital twin representing the power network or that a user has selected yes from each of the selection fields 204a204d. As such, and based on the background process or the user input, the DQS 145 performs the following: (1) an evaluation of the attributes of the digital twin representing the power network, (2) an evaluation of the connectivity of the digital twin representing the power network, (3) an evaluation of anomalies of the digital twin representing the power network utilizing machine learning, and (4) an analysis of a performance and/or behavior associated with the digital twin representing the utility network. It is noted that when the background process is performed by the DQS 145, the DQS may implement default evaluation(s) and/or analyses with default rules/weights that may be preconfigured or defined by an administrator. In this example, let it be assumed that the default evaluation(s) and/or analyses corresponds to performing all of the evaluations (attribute, connectivity, and anomalies) and performing an analysis of the digital twin.

Based on the evaluations and/or analysis with particular default or user provided selections, the DQS 145 may implement a scoring algorithm to generate one or more is scores for the digital twin representing the utility network 155. In this example, the DQS 145 may implement the scoring algorithm of:

$$\text{Total Score} = (AR+CS+ML+AN)/4,$$

where AR is the attribute score based on the evaluation of the attributes of the digital twin, CS is the connectivity score based on the evaluation of the connectivity of the digital twin, ML is the anomalies score based on the evaluation of anomalies of the digital twin utilizing machine learning, and AN is an analysis score based on the analysis of a performance or a behavior the digital twin. AR and CS may be different values based on whether the total score is the "as is" (baseline score) score or the "post auto-corrected score" (updated score), where AR and CS for the updated score take into account the potential corrections that may be applied to the digital twin. ML and AN for the baseline score and the updated score may be the same or different values.

In this example, the DQS 145 may utilize the following scoring algorithm to generate AR for the baseline score:

$$AR = 100 - (((3*\text{total number of high failures} + 2*\text{total number of medium failures} + \text{total number of low failures})/\text{total number of elements})*100).$$

In this example, the rule (default and/or user provided via field 206a) associated with the evaluation of the attributes may indicate that it is of high importance if a primary conductor voltage is "unset" in the digital twin. That is, for each instance of a component of type "primary conductor" in the digital twin, the DQS 145 detects if its property entitled "voltage" has a valid value (set) or invalid value (unset). A valid value may, for example, be 7.62 kV or some other particular voltage value. Invalid values may, for example, be "unknown" or no value stored in the property entitled "voltage" for the component. In addition, the rule may indicate that it is of low importance if a primary conductor circuit ID property is unset in the digital twin. That is, for each instance of a component of type "primary conductor" in the digital twin, the DQS 145 detects if its property entitled "circuit ID" has a valid value (set) or invalid value (unset). The is property "circuit ID" may indicate where the component, e.g., primary conductor, is being fed electricity from, e.g., which output location from a substation. A valid value may, for example, be North123 or a different identifier of a substation. Invalid values may, for example, be "unknown" or no value stored in the property entitled "circuit ID" for the component.

Therefore, the rule may define what attribute of the digital twin are deemed of high importance (i.e., high failures), medium importance (i.e., medium failures), and low importance (i.e., low failures). In this example, and based on the rule, medium importance (i.e., medium failures) is not defined and thus excluded when computing AR for the baseline score for the digital twin representing the power network. In this example, and based on the evaluation of the attributes of the digital twin representing the power network, the DQS 145 determines that the total number of elements in the digital twin is 6000 and the total number of primary conductor voltages that are unset in the digital twin is 200. In addition, and based on the evaluation of attributes, the DQS 145 determines that the total number of primary conductor circuit ID properties that are unset is 100. Because medium importance is not defined, the total number of medium failures is set to a value of 0. As such, the DQS 145 determines that AR, the attribute score, for the baseline score is 88.33 (e.g., 100−(((3*200+2*0+100)/6000)*100).

In this example, the DQS 145 may utilize the following scoring algorithm to generate CS for the baseline score:

$$CS = 100 - ((\text{total number of connectivity errors}/\text{total number of elements})*100).$$

In this example, the rule (default and/or user provided via field 206b) associated with the evaluation of connectivity may indicate that each meter must be able to trace through the network to at least one substation. Based on the evaluation of the connectivity of the digital twin representing the power network, the DQS 145 determine that the total number of meters that are not connected to at least one substation in the digital twin is 500. As such, the DQS 145 determines that CS, the connectivity score, for the baseline score is 91.67 (e.g., 100−((500/6000)*100).

In this example, the DQS 145 may utilize the following scoring algorithm to generate ML:

$$ML = 100 - ((\text{total number of anomalies}/\text{total number of elements})*100).$$

In this example, the rule (default and/or user provided via field 206c) associated with the evaluation of anomalies utilizing machine learning may indicate that anomalous distribution transformers in the digital twin are to be identified. Specifically, the DQS 145 may implement machine learning to compare a combination of a component's property values and the component's position within the digital twin representing the utility network 155 to identify those components that are to be anomalous or unusual. For example, an anomalous distribution transformer may be a distribution transformer with a secondary voltage of 120V when all other distribution transformers in the same area are 240V. Based the evaluation of the anomalies of the digital twin representing the power network, the DQS 145 determines that the total number of anomalies, e.g., anomalous distribution transformers, is 50. As such, the DQS 145 determines that ML, the anomalies score, is 99.17 (e.g., 100−((50/6000)*100).

In this example, the DQS 145 may utilize the following scoring algorithm to generate AN for the baseline score:

$$AN = 100 \text{ if analysis can be solved, 0 otherwise (e.g., unable to run or be solved).}$$

In this example, the type of analysis (default and/or user provided via field 208) may indicate that a power flow analysis of the digital twin representing the power network is to be performed. Further, the DQS 145 may determine that the power analysis cannot be performed because of the connectivity issues detected and present in the digital twin representing the power network. As such, the DQS 145 determines that AN, the analysis score, for the baseline score is 0.

Accordingly, the DQS 145 determines that the baseline score, i.e., total score, for the original state of the digital twin representing the power network is 69.79 (e.g., (88.33+91.67+99.17+0)/4).

Figure 3:
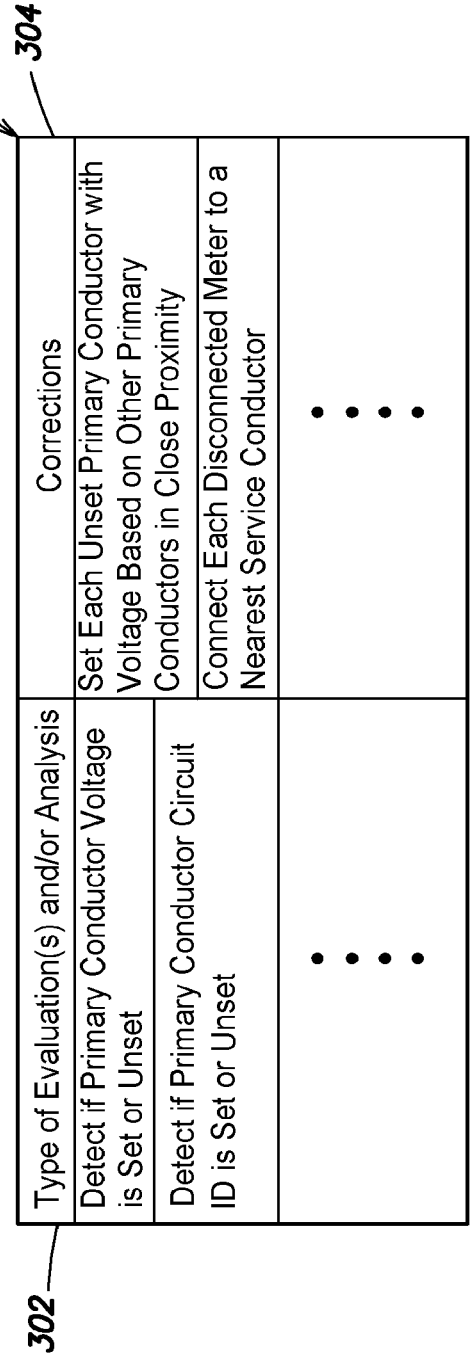
FIG. 3 is a diagram illustrating an example table that may be utilized to generate one or more correction to be applied to a digital twin based on the performance of one or more evaluations and/or analysis in accordance with an example embodiment.

Based on the performance of one or more evaluations and/or analysis, the DQS 145 may generate (i.e., determine) one or more corrections to be made to the digital twin. For example, the one or more correction may be preconfigured by an administrator and may be stored at the DQS 145. For example, the DQS 145 may store a table 300 that stores an association between types of evaluation(s)/analysis and one or more corrections. FIG. 3 is a diagram illustrating an example table that may be utilized to generate one or more correction to be applied to a digital twin based on the performance of one or more evaluations and/or analysis in accordance with an example embodiment.

For example, the table 300 may include a first column 302 that stores a type of one or more evaluations and/or analysis to be performed of the digital twin representing the utility network 155. In addition, table 300 may include a second column 304 that stores an identifier for one or more corrections for a digital twin that corresponds to a particular type of evaluation(s) and/or analysis. As such, and based on the one or more evaluations and/or analyses that are to be performed, the DQS 145 may index into table 300 to generate (i.e., determine) one or more corrections to be applied to the digital twin. The values and structure of table 300 are for exemplary purposes only, and it is expressly contemplated that the table 300 may take the form of a different structure and may include different values. Although reference is made to utilizing table 300 to generate (i.e., determine) the one or more corrections to be applied to the digital twin, it is expressly contemplated that other techniques may be utilized to generate (i.e., determine) the one or more corrections. For example, inferencing and/or machine learning may be utilized to generate the one or more corrections.

In this example, and based on the one or more evaluations and/or analysis as described above, the DQS 145 generates the following corrections to potentially be applied to the digital twin representing the power network 145:

(1) set each unset primary conductor with a voltage value based on the voltage of one or more other primary conductors in close proximity; and (2) connect each disconnected meter to a nearest service conductor.

Further, and based on the above corrections, the DQS 145 determines that a total of 200 primary conductors may be potentially corrected from "unset" to "set", and that a total of 500 disconnected meters may be potentially connected to a nearest service conductor. In addition, the DQS 145 determines that 0 primary conductor circuit ID properties can be corrected from "unset" to "set".

Therefore, the DQS 145 may utilize the total number of potential voltage set corrections with the following scoring algorithm to generate AR, the attribute score, for the updated score:

$AR=100-(((3*(\text{total number of high failures–total number of high importance corrections})+2*(\text{total number of medium failures–total number of medium importance corrections})+(\text{total number of low failures–total number of low importance corrections}))/\text{total number of elements})*100)$.

In this example, the total number of high importance correction that may be applied to the digital twin, the total number of medium importance corrections that may be applied to the digital twin, and the total number of low importance corrections that may be applied to the digital twin are respectively 200, 0, and 0. As such, the DQS 145 determines that AR, the attribute score, for the updated score is 98.33 (e.g., 100-(((3*(200-200)+2*(0—0)+(100-0))/6000)*100).

In this example, the DQS 145 may utilize the total number of potential connectivity corrections with the following scoring algorithm to generate CS, the connectivity score, for the updated score:

$CS=100-(((\text{total number of connectivity errors–total number of connectivity corrections})/\text{total number of elements})*100)$.

In this example, the total number of connectivity corrections that may be applied to the digital twin are 500. As such, the DQS 145 determines that CS, the connectivity score, for the updated score is 100 (e.g., 100-(((500-500)/600)*100).

Further, and due to the potential 500 connectivity corrections, the DQS 145 determines that the power analysis may be run after the connectivity corrections are implemented. As such, AN, the analysis score, for the updated score is 100.

Accordingly, the DQS 145 determines that the updated score for the updated state of the digital twin representing the power network is 99.38 (e.g., (98.33+100+99.17+100)/4).

Although the examples described herein includes particular evaluations and/or analysis, particular rules/weights, particular scoring algorithms, and particular values, it is expressly contemplated that the one or more embodiments described herein may utilize any of a variety of different evaluations and/or analyses, rules/weights, scoring algorithms, and particular values to generate the base line score and the updated score. For example, the total score may also be based on a maximum possible score for the class of score. Specifically, the total score may be calculated as:

Total Score=$(AR+CS+ML+AN)/(AR\text{max}+CS\text{max}+ML\text{max}+AN\text{max})*100$, Where ARmax is the maximum possible attribute score for the attributes class, CSmax is the maximum possible connectivity score for the connectivity class, MLmax is the maximum possible anomalies score for the anomalies class, and ANmax is the maximum possible analysis score for the analysis class.

In addition, although the example described herein generate the baseline score and the updated score for the utility network, it is expressly contemplated that the one or more embodiments described herein may generate the baseline score and the updated score for subnetworks of the utility network in a similar manner as described above, and then the scores for the subnetworks may be aggregate to generate a total score for the digital twin representing the utility network 155. As such, the one or more examples described herein are for illustrative purposes only.

Figure 4:
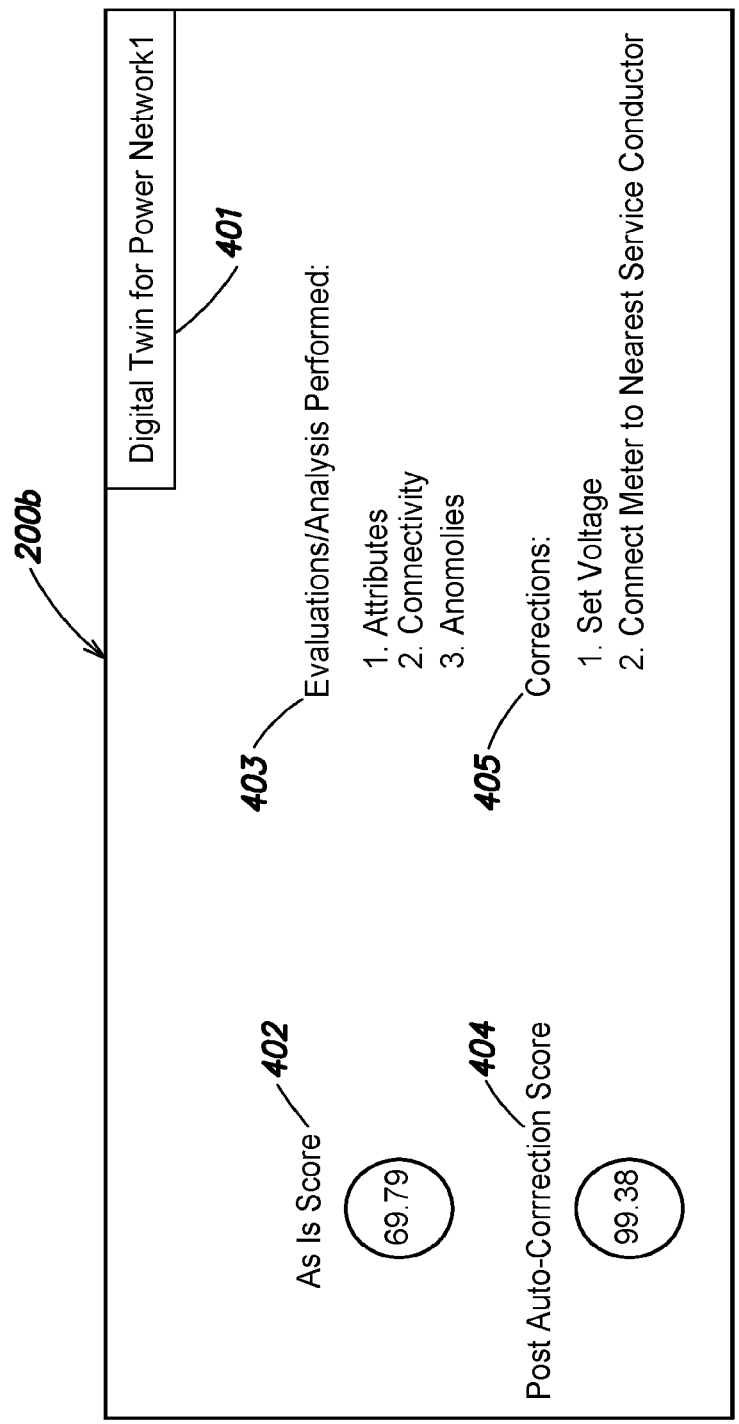
FIG. 4 is a diagram illustrating an example second user interface for displaying an as is score and a post auto-correction score in accordance with an example embodiment.

FIG. 4 is a diagram illustrating an example second user interface for displaying an as is score and a post auto-correction score in accordance with an example embodiment. Second user interface 200b may include a title field 401 that identifies the model 135, i.e., digital twin, under evaluation and/or analysis. In addition, the second user interface 200b may include an as is score field 402 that indicates the as is score generated by the DQS 145 and a post auto-correction score field 404 that indicates the post-correction score generated by the DQS 145. Accordingly, and by viewing second user interface 200b, a user may view the difference between the original state of the digital twin and the updated state of the digital twin (e.g., including the corrections), and thus understand the progress and evolution of the digital twin as corrections are applied to the digital twin over time. The second user interface 200b may further include an evaluation/analysis performed field 403 that indicates the evaluation(s) and/or analysis performed or to be performed on the digital twin, and correction fields 405 that indicates the type of corrections that may potentially be applied or have been applied to the digital twin. As such, the second user interface 200b may provide a summary view associated with the one or more evaluations and/or analysis performed or to be performed on the digital twin.

The DQS 145 may determine if the updated score meets or is above a threshold value. The threshold value may be predefined and may be any value. In this example, the threshold value may be set to a value of 90. As such, the updated score in this example of 99.38 for the digital twin representing the power network is above the threshold value. Therefore, the DQS 145 may automatically apply and save the corrections (e.g., attribute corrections and connectivity corrections) to the digital twin. The updated digital twin, with the applied corrections, may be stored on a repository of the repositories 132-134 via the iModelHub services 130.

Figure 5:
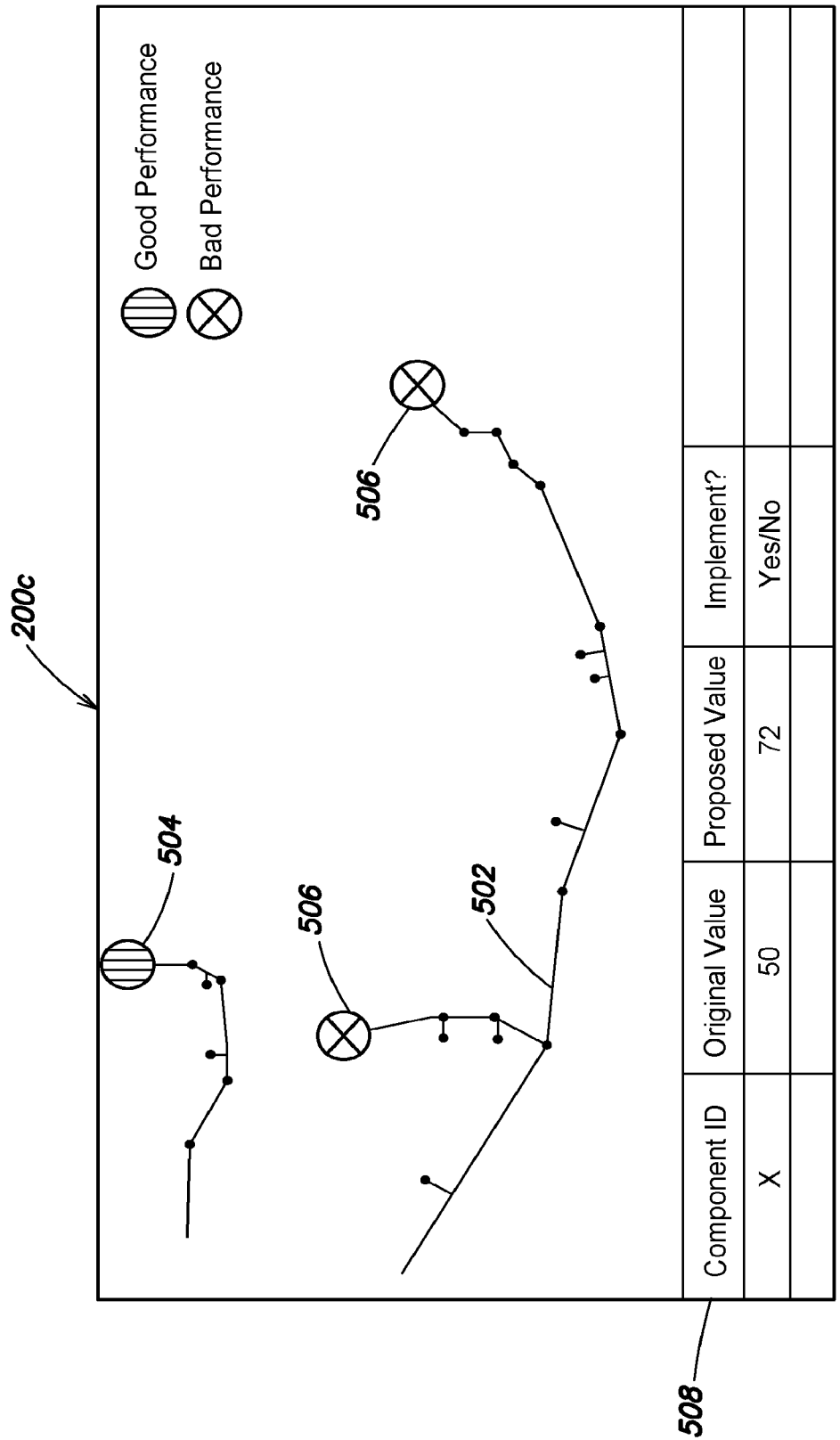
FIG. 5 is a diagram illustrating an example third user interface for displaying a graphical representation of a digital twin in accordance with an example embodiment.

If the updated score does not meet the threshold, the DQS 145 may present a failure notification and/or one or more graphical representations of the digital twin. FIG. 5 is a diagram illustrating an example third user interface for displaying a graphical representation of a digital twin in accordance with an example embodiment. Third user interface 200c may be a heat map of the digital twin 502 that indicates positive performance icon(s) 504 and negative performance icon(s) 506 associated with the digital twin representing the utility network 155. Based on a selection of, for example, a negative performance icon 506, the DQS 145 may provide, via the third user interface 200c, further details regarding the digital twin, such that the user can investigate in further detail the characteristics associated with the digital twin, and specifically the components that make up the portion of the digital twin that are associated with the negative performance.

In addition, the third user interface 200c may include a list 508 that identifies the components of the digital twin, an original value associated with the component, a proposed value if the component is corrected, and an implement value that allows the user to either implement or not implement the correction for the component. Thus, the user may select yes as the implement value from list 508 to individually select particular corrections to update the digital twin, which in turn iteratively and incrementally updates the digital twin. Accordingly, the user can iteratively and incrementally improve the digital twin with selected corrections via the third user interface 200c until, for example, the updated score reaches a particular value or meets the threshold value.

Figure 6:
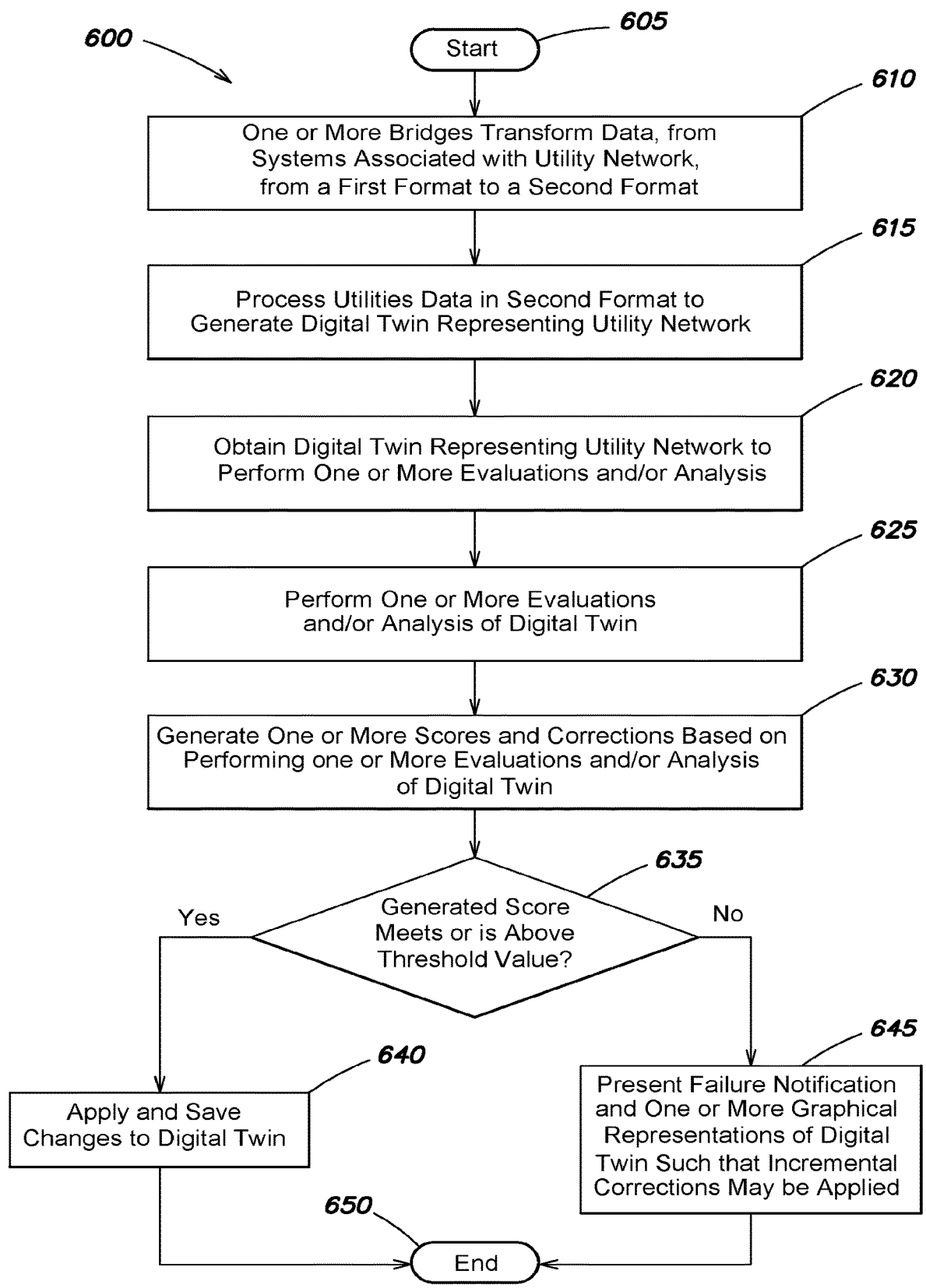
FIG. 6 is a flow diagram for generating one or more scores and/or one or more corrections for a digital twin representing a utility network in accordance with an example embodiment.

FIG. 6 is a flow diagram for generating one or more scores and/or one or more corrections for a digital twin representing a utility network in accordance with an example embodiment. The procedure 600 starts at step 605 and continues to step 610 where one or more bridges 115 transform data, from a plurality of different systems and associated with a utility network, from one or more first formats to a second format, e.g., a format compatible with a relational database (e.g., a SQLite database). For example, the systems 112 associated with the utility network 155 may include, but are not limited to, a GIS, a DMS, and/or a CMS.

The procedure continues to step 615 and a process utilizes the data in the second format to generate a digital twin representing the utility network 155. For example, iModelHub services 130 may receive the data in the second format from the one or more bridges 115 and generate the digital twin representing the utility network 155. The digital twin, i.e., model 135, may be stored on a repository of the repositories 132-134.

The procedure continues to step 620 where a digital twin representing a utility network is obtained to perform one or more evaluations and/or analysis. The DQS 145 may obtain the digital twin, i.e., model 135, from a repository of the repositories 132-134 via the iModelHub services 130. For example, the iModelHub services 130 may detect a change to the digital twin, i.e., model 135, stored on a repository of the repositories 132-134, and then provide the digital twin to the DQS 145 to perform the one or more evaluations and/or analysis. In addition or alternatively, a user may utilize the interface 200 and may issue a request to the DQS 145 to perform one or more evaluations and/or analysis on the digital twin representing the utility network. The request may include, for example, an infrastructure ID, a model ID, and/or version ID. Based on the request, the DQS 145 may receive the digital twin via the iModelHub services 135.

is The procedure continues to step 625 and one or more evaluations and/or analysis are performed of the digital twin representing the utility network 155 utilizing, for example, particular rules/weights. For example, the DQS 145 may perform the one or more evaluations and/or analysis as a background process and based on the iModelHub services 130 detecting a change to the digital twin. In addition or alternatively, the DQS 145 may perform the one or more evaluations and/or analysis on-demand and based on selections made utilizing first user interface 200a. The one or more evaluations and/or analysis may be implemented by the DQS 145 and include, but are not limited to, (1) an evaluation of attributes of the digital twin representing the utility network, (2) an evaluation of connectivity of the digital twin representing the utility network, (3) an evaluation of anomalies of the digital twin representing the utility network utilizing machine learning, or (4) an analysis of a performance and/or behavior associated with the digital twin representing the utility network.

The procedure continues to step 630, where one or more scores and one or more corrections are generated based on the performance of the one or more evaluations and/or analysis of the digital twin. For example, the DQS 145 may generate an "as is" score representing the original state of the digital twin and a "post auto-correction" score representing an updated state of the digital twin if the corrections are applied. For example, the scores may be based on a scoring algorithm of:

$$\text{Total Score} = (AR + CS + ML + AN)/4,$$

where AR is the attribute score based on the evaluation of the attributes of the digital twin, CS is the connectivity score based on the evaluation of connectivity of the digital twin, ML is the anomalies score based on the evaluation of anomalies of the digital twin utilizing machine learning, and AN is analysis score based on the analysis of a performance or a behavior the digital twin. AR and CS may be different values based on whether the total score is the "as is" (baseline score) score or the "post auto-corrected score" (updated score), where AR and CS for the updated score take into account the potential application of corrections to the digital twin. ML and AN for the baseline score and the updated score may be the same or different values. Further, based on performing the one or more evaluations and/or analysis, one or more corrections may be generated that may be applied to the digital twin. For example, a correction may be that an unset voltage for a primary conductor should be set to a value of a different primary conductor in close proximity. In addition, the second user interface 200b may be presented to the user such that the user can view the as is score and the post auto-correction score and obtain a summary view associated with the one or more evaluations and/or analysis performed on the digital twin.

The procedure continues to step 635 and it is determined if the generated score meets or is above a threshold value. The threshold value may be preconfigured or defined by an administrator. The DQS 145 may compare the post auto-correction score, generated based on the one or more evaluations and/or analysis performed of the digital twin, to the threshold value to determine if the post auto-correction score meets or is above the threshold value.

If at step 635 it is determined that the generated score meets or is above the threshold value, the procedure continues to step 640 and the corrections are applied and saved to the digital twin. Specifically, the DQS 145 may apply the changes to the digital twin representing the utility network 155 and the updated digital twin may be stored and saved on a repository of the repositories 132-134 via the iModelHub services 130. In addition, based on the generated score meeting or being above the threshold value, one or more corrective actions may be issued to the utility network 155. For example, the DQS 145 may issue the one or more corrective actions to the utility network 155 via the client device 150 or directly to the utility network 155, where the corrective actions may correspond to the corrections applied to the digital twin. As such, the corrective actions may be implemented at the utility network 155 such that the physical twin matches the digital twin.

If at step 635 it is determined that the generated score does not meet the threshold value, the procedure continues to step 645 and a failure notification and one or more graphical representations of the digital twin may be presented via the user interface such that incremental corrections may be made to the digital twin. For example, the DQS 145 may present the third user interface 200c that is a heat map, and the user may interact with the third user interface 200c to individually select particular corrections to update the digital twin and re-perform the evaluations and/or analysis, which in turn incrementally updates the digital twin. The DQS 145 may then issue the one or more corrective actions to the utility network 155. The procedure ends at step 650.

By performing the evaluation(s) and/or analysis and then automatically applying and saving the corrections to the digital twin representing the utility network, the one or more embodiments described herein provided an improvement in the technological field of computer-based infrastructure modeling systems. Specifically, the digital twin, which is updated based on the implementation of the corrections, includes less errors than the digital twin representing the original state of the utility network. As such, the one or more embodiments described herein improve the structure and configuration of the digital twin that represents the utility network. In addition, and based on the evaluation(s) and/or analysis performed of the digital twin, corrective actions can be made at the physically twin such that it matches the updated digital twin to improve the performance, behavior, and/or attributes of the physical utility network. As such, the one or more embodiments described herein provide techniques for improve the configuration and structure of the actual physical utility network such that it includes less errors or issues (e.g., meter being disconnected) than the original state of the utility network.

It should be understood that a wide variety of adaptations and modifications may be made to the techniques. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. An infrastructure modeling system, comprising:
   a processor coupled to a memory, the processor when executed configured to:
   detect a change to a model representing a utility network including a plurality of components;
   automatically perform, in response to detecting the change, an evaluation or analysis of the model, wherein the evaluation or analysis is one a plurality of different types of evaluations or analysis;
   determine a correction for a selected component represented in the model, wherein the correction corresponds to the evaluation or analysis automatically performed on the model;
   determine a baseline score for the model without application of the correction for the selected component represented in the model;
   determine a correction score for the model if the correction for the selected component represented in the model is applied; and
   apply the correction to the selected component of the model or display, on a display screen, the correction for selection by a user.

2. The infrastructure modeling system of 1, the processor further configured to:
   apply the correction to the selected component when the correction score is determined to be at or above a threshold value; and
   display the correction for selection by the user when the correction score is determined to be less than the threshold value.

3. The infrastructure modeling system of claim 1, wherein the plurality of different types of evaluations or analysis includes at least two of (1) an evaluation of attributes of the model representing the utility network, (2) an evaluation of connectivity of the model representing the utility network, (3) an evaluation of anomalies of the model representing the utility network utilizing machine learning, or (4) an analysis of a performance or behavior associated with the model representing the utility network.

4. The infrastructure modeling system of claim 1, wherein the utility network is a network associated with electricity, a network associated with gas, a network associated with water, a network associated with cooling and/or heating, or a network associated with wastewater.

5. The infrastructure modeling system of claim 1, wherein the processor is further configured to:
   display, on the display screen, a heat map indicating which of the plurality of components of the utility network have positive performance and negative performance.

6. The infrastructure modeling system of claim 5, wherein the processor is further configured to:
   receive a selection of the selected component on the heat map; and
   apply, in response to receiving the selection, the correction of the selected component.

7. The infrastructure modeling system of claim 1, wherein the processor is further configured to:
   perform one or more additional evaluations or analysis of the model without application of the correction;
   determine, for the model without application of the correction, an individual score for each of the one or more additional evaluations or analysis;

add the individual scores and the baseline score to produce a sum; and divide the sum by a value that is equal to a number of the one or more additional evaluations or analysis plus 1, wherein the dividing results in a total baseline value for the model without application of the correction.

8. A method, comprising:

detecting, by a processor, a change to a model representing a utility network including a plurality of components;

performing, automatically and in response to detecting the change, an evaluation or analysis of the model,
wherein the evaluation or analysis is one a plurality of different types;

determining a correction for a selected component represented in the model, wherein the correction corresponds to the evaluation or analysis automatically performed on the model;

determining a baseline score for the model without application of the correction for the selected component represented in the model;

determining a correction score for the model if the correction for the selected component represented in the model is applied; and applying the correction to the selected component of the model or display, on a display screen, the correction for selection by a user.

9. The method of 8, further comprising:

applying the correction to the selected component when the correction score is determined to be at or above a threshold value; and displaying the correction for selection by the user when the correction score is determined to be less than the threshold value.

10. The method of 8, wherein the plurality of different types of evaluations or analysis includes at least two of (1) an evaluation of attributes of the model representing the utility network, (2) an evaluation of connectivity of the model representing the utility network, (3) an evaluation of anomalies of the model representing the utility network utilizing machine learning, or (4) an analysis of a performance or behavior associated with the model representing the utility network.

11. The method of 8, wherein the utility network is a network associated with electricity, a network associated with gas, a network associated with water, a network associated with cooling and/or heating, or a network associated with wastewater.

12. The method of 8, further comprising:

displaying, on the display screen, a heat map indicating which of the plurality of components of the utility network have positive performance and negative performance.

13. The method of claim 12, further comprising:

receiving a selection of the selected component on the heat map; and applying, in response to receiving the selection, the correction of the selected component.

14. The method of claim 8, further comprising:

performing one or more additional evaluations or analysis of the model without application of the correction;

determining, for the model without application of the correction, an individual score for each of the one or more additional evaluations or analysis;

adding the individual scores and the baseline score to produce a sum; and dividing the sum by a value that is equal to a number of the one or more additional evaluations or analysis plus 1, wherein the dividing results in a total baseline value for the model without application of the correction.

15. A non-transitory computer readable medium having software encoded thereon, the software when executed by one or more computing devices operable to:

detecting a change to a model representing a utility network including a plurality of components;

performing, automatically and in response to detecting the change, an evaluation or analysis of the model,
wherein the evaluation or analysis is one a plurality of different types;

determining a correction for a selected component represented in the model, wherein the correction corresponds to the evaluation or analysis automatically performed on the model;

determining a baseline score for the model without application of the correction for the selected component represented in the model;

determining a correction score for the model if the correction for the selected component represented in the model is applied; and applying the correction to the selected component of the model or display, on a display screen, the correction for selection by a user.

16. The non-transitory computer readable medium of claim 15, further comprising:

applying the correction to the selected component when the correction score is determined to be at or above a threshold value; and displaying the correction for selection by the user when the correction score is determined to be less than the threshold value.

17. The non-transitory computer readable medium of claim 15, wherein the plurality of different types of evaluations or analysis includes at least two of (1) an evaluation of attributes of the model representing the utility network, (2) an evaluation of connectivity of the model representing the utility network, (3) an evaluation of anomalies of the model representing the utility network utilizing machine learning, or (4) an analysis of a performance or behavior associated with the model representing the utility network.

18. The non-transitory computer readable medium of claim 15, wherein the utility network is a network associated with electricity, a network associated with gas, a network associated with water, a network associated with cooling and/or heating, or a network associated with wastewater.

19. The non-transitory computer readable medium of claim 15, the software further operable to:

displaying, on the display screen, a heat map indicating which of the plurality of components of the utility network have positive performance and negative performance.

* * * * *